(12) United States Patent
Troitski

(10) Patent No.: US 6,727,460 B2
(45) Date of Patent: Apr. 27, 2004

(54) SYSTEM FOR HIGH-SPEED PRODUCTION OF HIGH QUALITY LASER-INDUCED DAMAGE IMAGES INSIDE TRANSPARENT MATERIALS

(75) Inventor: Igor Troitski, Henderson, NV (US)

(73) Assignee: Troitski, Henderson, NV (US)

( * ) Notice: Subject to any disclaimer, the term of this patent is extended or adjusted under 35 U.S.C. 154(b) by 64 days.

(21) Appl. No.: 10/075,018

(22) Filed: Feb. 14, 2002

(65) Prior Publication Data

US 2003/0150847 A1 Aug. 14, 2003

(51) Int. Cl.[7] ................................................. B23K 26/00
(52) U.S. Cl. ............................. 219/121.68; 219/121.67
(58) Field of Search ...................... 219/121.68, 121.67, 219/121.69, 121.85, 121.6, 121.78

(56) References Cited

U.S. PATENT DOCUMENTS

| | | |
|---|---|---|
| 3,715,734 A | 2/1973 | Fajans |
| 4,092,518 A | 5/1978 | Merard |
| 4,564,739 A | 1/1986 | Mattelin |
| 4,642,701 A | 2/1987 | Maeda et al. |
| 4,806,454 A | 2/1989 | Yoshida et al. |
| 4,843,207 A | 6/1989 | Urbanek |
| 4,997,747 A | 3/1991 | Yoshida et al. |
| 5,206,496 A | 4/1993 | Clement |
| 5,272,309 A | 12/1993 | Goruganthu et al. |
| 5,473,475 A | 12/1995 | Sweatt et al. |
| 5,575,936 A | 11/1996 | Goldfarb |
| 5,637,244 A | 6/1997 | Erokhin |
| 5,745,511 A | 4/1998 | Leger |
| 5,786,560 A | 7/1998 | Tatah |
| 5,886,318 A | 3/1999 | Vasiliev et al. |
| 6,087,617 A | 7/2000 | Troitski et al. |

(List continued on next page.)

FOREIGN PATENT DOCUMENTS

| | | |
|---|---|---|
| EP | 0743128 A1 | 11/1996 |
| JP | 52-39893 | 3/1977 |
| JP | 1-233086 | 9/1989 |
| JP | 409184706 A | 7/1997 |
| RU | 321422 | 11/1970 |
| RU | 20082288 C1 | 2/1994 |
| RU | WO 96/30219 | 3/1995 |

OTHER PUBLICATIONS

Troitski."System for creation of laser–induced damage images and problems of their optimization". Proc. of SPIE, vol. 3902 (2000), 489–499.*

(List continued on next page.)

Primary Examiner—M. Alexandra Elve

(57) ABSTRACT

The system for high-speed production of high quality laser-induced damage images inside transparent materials is disclosed. One or more embodiments of the invention disclose a system, which produces the said images by the combination of an electro-optical deflector and means for moving the article or focusing optical system. The combination of the said devices together with using of two laser beams allows increase the image production speed substantially, without the image deterioration. One or more embodiments of the invention disclose a system for creation of a laser-induced damage by generation of breakdowns at several separate centers by using the computing phase hologram, the phase structure of which is calculated so that the laser beam, passing through the hologram, is focused at several spots. One or more embodiments of the invention disclose a system for creation of a laser-induced damage by generation of breakdowns at area where two laser beams intersect. This decreases the image deterioration conditioned by the use of a deflector and allows to create etch points with different brightness for different directions.

5 Claims, 3 Drawing Sheets

U.S. PATENT DOCUMENTS

| | | | |
|---|---|---|---|
| 6,322,958 B1 | * | 11/2001 | Hayashi |
| 6,333,485 B1 | * | 12/2001 | Haight et al. |
| 6,333,486 B1 | | 12/2001 | Troitski |
| 6,392,683 B1 | * | 5/2002 | Hayashi |
| 6,399,914 B1 | * | 6/2002 | Troitski |
| 6,417,485 B1 | * | 7/2002 | Troitski ................. 219/121.69 |
| 6,426,480 B1 | * | 7/2002 | Troitski ................. 219/121.68 |
| 2002/0195433 A1 | * | 12/2002 | Troitski ................. 219/121.69 |

OTHER PUBLICATIONS

Troitski,"Experience of creation of laser–induced damage images." Proc. of SPIE, vol. 3902 (2000). 479–488.*

Troitski,"Image recording by laser–induced damages," Optical Memory and Neural Networks, vol. 9, No. 4. 2000.*

Troitski, "Method and laser system for creating high–resolution laser–induced damage images" Proc. of SPIE, vol. 4679 (2001). 392–399.*

Troitski, Systems for creation of laser–induced damage images and problems of their optimization, Proc. of SPIE vol.3902 (2000), pp. 489–499.

Troitski, Experience of creation of laser–induced damage images, Proc. of SPIE vol. 3902 (2000), pp. 479–488.

Troitski, Image recording by laser–induced damages, Optical Memory and Neural Networks, vol. 9, No. 4, 2000, pp. 233–238.

* cited by examiner

SYSTEM FOR HIGH-SPEED PRODUCTION OF HIGH QUALITY LASER-INDUCED DAMAGE IMAGES INSIDE TRANSPARENT MATERIALS

FIELD OF THE INVENTION

The present invention relates to system and apparatus for producing high quality laser-induced damage images, which are a plurality of damages inside a transparent material created by a pulsed laser beam, which is periodically focused at predetermined points of the material.

BACKGROUND OF THE INVENTION

A number of techniques for creating a variety of patterns on the surface and inside of transparent substrates using pulsed laser radiation are well known.

One publication disclosing such techniques is the Russian invention #321422 to Agadjanov et. al., published on Nov. 16, 1970 (#140454529-33). The invention concerns a method of manufacturing decorative products inside a transparent material by changing the material structure by laser radiation. As disclosed, by moving a material relative to a focused laser beam, it is possible to create a drawing inside the material.

U.S. Pat. No. 3,715,734 to Fajans discloses a three-dimensional memory storage unit, which is prepared by carbonizing selected spots in a block of polymethylmethacrylate by means of a steeply converging laser beam. The energy of the beam is applied in pulses of such duration and at such intensity that carbonization takes place only at the focal point of the beam. U.S. Pat. No. 4,092,518 to Merard discloses a method for decorating transparent plastic articles. This technique is carried out by directing a pulsed laser beam into the body of an article by successively focusing the laser beam in different regions within the body of the article. The pulse energy and duration is selected based upon the desired extent of the resulting decorative pattern. The effect of the laser is a number of "macro-destructions" (fissures in the material of the article) appearing as fanned-out cracks. The pattern of the cracks produced in the article is controlled by changing the depth of the laser beam focus along the length of the article. Preferably, the article is in the form of a cylinder, and the cracks are shaped predominantly as saucer-like formations of different size arranged randomly around the focal point of the optical system guiding a laser beam. The device used to carry out this technique is preferably a multi-mode solid-state, free-running pulse laser used in conjunction with a convergent lens having a focal length from 100 to 200 mm.

U.S. Pat. No. 4,843,207 to Urbanek et al. discloses a method of creating controlled decorations on the surface of a hollow symmetrical transparent article. This technique is preferably carried out on glass. The glass is preconditioned with a coating on the outer surface of the glass being approximately 1.2 mm thick and made of a material having at least 75% absorption of laser radiation. The technique is also carried out using a laser having a wave of length of 0.5 to 2 microns acting upon the external coating through the wall of the cylindrical glass article. The laser beam moves so that it is focused on the surface of the cylinder, and moves about the axis of symmetry of the cylinder to irradiate the aforementioned surface coating. As a result, the irradiated portions of the surface coating go through a phase change and a pattern is formed.

U.S. Pat. No. 5,206,496 to Clement et al. discloses a method and apparatus for providing in a transparent material, such as glass or plastic, a mark which is visible to the naked eye or which may be "seen" by optical instruments operating at an appropriate wavelength. The Clement et al. Patent describes a method and apparatus for producing a subsurface marking which is produced in a body such as bottle, by directing into the body a high energy density beam and bringing the beam to focus at a location spaced from the surface, so as to cause localized ionization of the material. In the preferred embodiment the apparatus includes a laser as the high energy density beam source. The laser may be a Nd-YAG laser that emits a pulsed beam of laser radiation with a wavelength of 1064 nm. The pulsed beam is incident upon a first mirror that directs the beam through a beam expander and a beam combiner to a second mirror. A second source of laser radiation in the form of a low power He-Ne laser emits a secondary beam of visible laser radiation with a wavelength of 638 m. The secondary beam impinges upon the beam combiner where it is reflected toward the second reflecting surface coincident with the pulsed beam of laser radiation from the Nd-YAG laser. The combined coincident beams are reflected at the reflecting surface via reflecting two other surfaces to a pair of movable mirrors for controlling movement of the beam. The beam then passes through a lens assembly into the body to be marked.

Soviet patent publication 1838163 to P. V. Agrynsky, et. al discloses a process for forming an image in a solid media by processing of the optically transparent solid material by a beam of radiation with changeable energy for creation of the image.

WIPO Patent Document No. 96/30219 to Lebedev et al. discloses a technology for creating two- or three-dimensional images inside a polymer material using penetrating electromagnetic radiation. The technology can be used for marking and for producing decorative articles and souvenirs. Specifically, laser radiation is used as the penetrating radiation, and carbonizing polymers are used as the polymer material. By these means, it is possible to produce both black and half-tone images in the articles.

U.S. Pat. No. 5,575,936 to Goldfarb discloses a process and apparatus where a focused laser beam causes local destruction within a solid article, without effecting the surface thereof. The apparatus for etching an image within a solid article includes a laser focused to a focal point within the article. The position of the article with respect to the focal point is varied. Control means, coupled to the laser, and positioning means are provided for firing the laser so that a local disruption occurs within the article to form the image within the article.

U.S. Pat. No. 5,637,244 to Erokhin discloses a technique which depends on a particular optical system including a diffraction limited Q-switched laser (preferably a solid-state single-mode $TEM_{oo}$) aimed into a defocusing lens having a variable focal length to control the light impinging on a subsequent focusing lens that refocuses the laser beam onto the transparent article being etched. The laser power level, operation of the defocusing lens, and the movement of the transparent article being etched are all controlled by a computer. The computer operates to reproduce a pre-programmed three-dimensional image inside the transparent article being etched. In the computer memory, the image is presented as arrays of picture elements on various parallel planes. The optical system is controlled to reproduce the stored arrays of picture elements inside the transparent material. A method for forming a predetermined half-tone image is disclosed. Accordance to the method, microdestructions of a first size are created to form a first portion of the image and microdestruction of a second size different from the first size are created to form a second portion of the image. Microdestructions of different sizes are created by changing the laser beam focusing sharpness and the radiation power thereof before each shot.

U.S. Pat. No. 5,886,318 to A. Vasiliev and B. Goldfarb discloses a method for laser-assisted image formation in transparent specimens, which consists in establishing a laser beam having different angular divergence values in two mutually square planes. An angle between the plane with a maximum laser beam angular divergence and the surface of the image portion being formed is changed to suit the required contrast of an image.

EPO Patent Document 0743128 to Balickas et al. disclose a method of marking products made of transparent materials which involves concentration of a laser beam in the material which does not absorb the beam, at a predetermined location, destruction of the material by laser pulses and formation of the marking symbol by displacement of the laser beam. Destruction of the material at that location takes place in two stages. In the first stage, the resistance of the material to laser radiation is altered, while, in the second stage, destruction of the material takes place at that location.

Russian patent publication RU 20082288 to S. V. Oshemkov discloses a process for laser forming of images in solid media by the way of focusing of laser radiation in a point inside a sample which differs by following: with the aim to save the surface and the volume of the sample before the definite point and creation of three dimensional images, the sample is illuminated with the power density higher than the threshold of volume breakdown and moving the sample relatively to the laser beam in three orthogonal directions.

U.S. Pat. No. 6,087,617 to Troitski et al. discloses a computer graphic system for producing an image inside optically transparent material. An image reproducible inside optically transparent material by the system is defined by potential etch points, in which the breakdowns required to create the image in the selected optically transparent material are possible. The potential etch points are generated based on the characteristics of the selected optically transparent material. If the number of the potential etch points exceeds a predetermined number, the system carries out an optimization routine that allows the number of the generated etch points to be reduced based on their size. To prevent the distortion of the reproduced image due to the refraction of the optically transparent material, the coordinates of the generated etch points are adjusted to correct their positions along a selected laser beam direction.

U.S. patent application Ser. No. 09/354,236 to Troitski discloses a laser-computer graphic system for generating portrait and 3-D reproductions inside optically transparent material. The invention discloses the method for production of a portrait with the same gray shades like a computer image by using a multi-layer picture. Points of every layer are arranged so that the distance between adjacent etch points are equal to the minimal distance between etch points that can be provided without the breakage of the material. Every layer is parallel with respect to the portrait plane, and distance between parallel planes is set equal to minimal distance at which the breakage of the material does not occur.

U.S. Pat. No. 6,333,486 to Troitski discloses method and laser system for creation of laser-induced damages to produce high quality images. Accordance to the invention, a laser-induced damage is produced by simultaneously generating breakdowns in several separate focused small points inside the transparent material area corresponding to this etch point. Damage brightness is controlled by variation of a number of separate focused small points inside the transparent material area.

U.S. patent application Ser. No. 09/583,454 to Troitski discloses method and laser system controlling breakdown process development and space structure of laser radiation for production of high quality laser-induced damage images. Accordance to the invention, at the beginning an applied laser radiation level just exceeds an energy threshold for creating a plasma condition in the material, and thereafter the energy level of the applied laser radiation is just maintain the plasma condition. Accordance to another method a laser generates a $TEM_{mn}$ radiation. The values of the integers m and n are controlled and determined so as to reproduce particular gray shades for a particular point of an image.

Analyzing the systems and apparatus of all aforementioned Patents it is clear that they disclose production of laser-induced damage images only by using the simplest systems, which focus laser beam inside a transparent material. The systems displace mutually a transparent material and a laser beam in order to establish a next damage. It is important to notice that the systems can't produce the high quality laser-induced damage images with high speed. For implementation of more perfect systems for high-speed production of high quality laser-induced damage images it is necessary to use more modem systems performing more complicated reformations of laser beams such as their space modulation; splitting general laser beam into a plurality of separate beams; directing the separate laser beams onto a target point within a sample such that the pulses of the separate beams are overlapped to create an intensity sufficient to treat the sample; using beam deflection with moving focus-deflection assembly and the article in different direction simultaneously.

A number of techniques for realization of such laser beams reformation are well known.

U.S. Pat. No. 4,564,739 to Mattelin discloses a method and apparatus for simultaneously labeling or inscribing two parts by using a laser beam, characterized by a beam from a laser being subdivided into two sub-beams which are guided to a deflection optic system with different angles of incidence so than the deflected sub beams when focused on a work surface are laterally displaced to enable inscribing or labeling two parts.

U.S. Pat. No. 5,786,560 to Tatah et al discloses apparatus for treating a material that includes an ultraviolet laser for generating an ultraviolet wavelength laser beam having femtosecond pulse and directing that ultraviolet wavelength laser beam onto a beam splitter; a beam splitter for splitting the ultraviolet wave length laser beam into a plurality of separate laser beams having femtosecond pulses; directing the separate laser beams onto a target point within a sample such that the femtosecond pulses of the separate beams overlap to create an intensity sufficient to treat the sample.

Japanese patent publication 52-39893 to Hosokawa et al. discloses a device used in working a material by irradiating a laser beam. A laser beam-irradiating device has a plurality of reflection mirrors for bending horizontal laser beams emitted by a laser oscillator toward a direction of a material to be worked, and has a plurality of focusing lens for focusing the laser beams reflected from the reflection mirror, on the material. One laser beam emitted by the oscillator is divided by a combination of a half mirror and a whole reflection mirror into the plurality of laser beams and is led to each corresponding focusing lens through the corresponding reflection mirror.

Japanese patent publication 1-233086 to Tanaka discloses a laser beam machine in which beam splitters are arranged in series on the laser beam path of a laser oscillator and a total reflection mirror is provided on the extension line thereof. In this case, the branching ratio of the reflection and transmission rates of the splitters is adequately set to uniformize the beam output to each laser head.

U.S. Pat. No. 5,473,475 to Sweatt et al. discloses a technique in which a circular optical beam, for example a copper vapor laser beam, is converted to a beam having a profile other than circular, e.g. square or triangular. This is accomplished by utilizing a single optical mirror having a reflecting surface designed in accordance with a specifically derived formula in order to make the necessary transformation, without any substantial light loss and without changing substantially the intensity profile of the circular beam, which has a substantially uniform intensity profile. In this way, the output beam can be readily directed into the dye cell of dye laser.

Japanese patent publication JP409184706A to Ukigusa et al. discloses a system in which a beam splitter reflects a part of the incident light from a reflecting mirror toward a measuring optical system. A mask, acting as a to-be-measured body, is vertically irradiated with the incident light from an objective lens through a light transmitting layer. Meanwhile, the focus setting optical system consists of reflecting mirror, a shutter, a beam splitter, a focus setting photodetector, a focusing lens and a focus setting objective lens, etc.

U.S. Pat. No. 5,272,309 to Goruganthu et al. discloses laser system in which a first laser beam and a second laser beam with a longer wavelength than the first laser beam are directed at a first metal member in contact with a second metal member. At the ambient temperature the first member has high absorption of energy from the first laser beam but low absorption of energy from the second laser beam. As the first member absorbs energy from the first laser beam the temperature of the first member increases and the reflectivity of the first member decreases so that the first member has high absorption of energy from the second laser beam.

U.S. Pat. No. 4,642,701 to Maeda et al. discloses a device for switching a scanning beam diameter, incorporated into a picture image scanning and recording device, which switches the diameter of the scanning beam in response to the density of number of scanning lines. Such laser beams reformations are well known.

U.S. Pat. No. 4,806,454 to Yoshida et al. and U.S. Pat. No. 4,997,747 to Yoshida et al. disclose a method the formation of a diffraction grating on a substrate using a holographic technique and an etching technique, wherein the periodicity of the pattern of the diffraction grating can be changed at will by a change of the light-path length of one of the two light fluxes from a holographic exposing system.

U.S. Pat. No. 5,745,511 to Leger discloses a method for marking a custom phase-conjugating diffractive mirror comprising the steps of: (a) choosing a specified beam mode profile $a_1(x,y)$ that will suit need of said designer, (b) calculating the mode profile $b(x',y')$ which is a value of the specified beam $a_1(x,y)$ that is propagated to the reflection surface of the diffractive mirror and (c) calculating mirror reflectance $t(x',y')$ which reflects phase conjugate of $b(x',y')$.

The purpose of the present invention is disclosing of the laser system for high-speed production of high quality laser-induced damage images based on high-end technology.

SUMMARY OF THE INVENTION

The present invention has its principal task to provide a system for high-speed production of high quality laser-induced damage image, which has the large number of the damages.

One or more embodiments of the invention disclose a system, which produces laser-induced damages by using the combination of an electro-optical deflector and means for moving the article or focusing optical system. The combination of the said devices together with using of two laser beams allows increase the image production speed substantially, without the image deterioration.

One or more embodiments of the invention disclose a system for creation of a laser-induced damage by generation of breakdowns at several separate centers by using the computing phase hologram, the phase structure of which is calculated so that the laser beam passing through the hologram is focused at several spots.

One or more embodiments of the invention disclose a system for creation of a laser-induced damage by generation of breakdowns at area where two laser beams intersect. This decreases the image deterioration conditioned by the use of a deflector.

One or more embodiments of the invention disclose a system for creation of a laser-induced damage, which can have different brightness for two mutually perpendicular directions and its values can be controlled during image production.

DETAILED DESCRIPTION OF THE INVENTION

The invention comprises system for high-speed production of laser-induced damage images inside optically transparent materials. In general, the invention relates to systems, in which laser energy is utilized to generate laser-induced damages based on the breakdown phenomenon.

A laser-induced damage image is a plurality of damages inside a transparent material created by a pulsed laser beam, which is periodically focused at the predetermined points of the material. These damages become visible by scattering the exterior light.

The quality of a laser-induced damage image is determined by the following basic factors:
- the number of the damages contained in the image;
- the shapes and the sizes of the separate damages;
- the arrangement of the damages creating the image.

To create high quality laser-induced damage image it is necessary to produce more than 50,000 and sometimes more than 100,000 damages. Today there are pulsed lasers, which can be used for production of laser-induced damage images and which have repetition frequency about 500–1000 Hz. Using the lasers it is possible to produce high quality images for 1–2 minutes of time. The possibility can become the actuality only if the laser beam migrates from one point to another for 0.001–0.002 sec. Most simple way of high-speed laser beam migration is the scan of the beam by the electro-optics deflectors. However, the use of a deflector for this task has very important particularity. The problem is that when laser beam angle is increased then the condition of beam focusing is changed and consequently the laser-induced damage is displaced, becomes longer and modifies its orientation. These factors disturb the uniformity of the laser-induced damage images and create the false modulation of their brightness.

Figure 1:
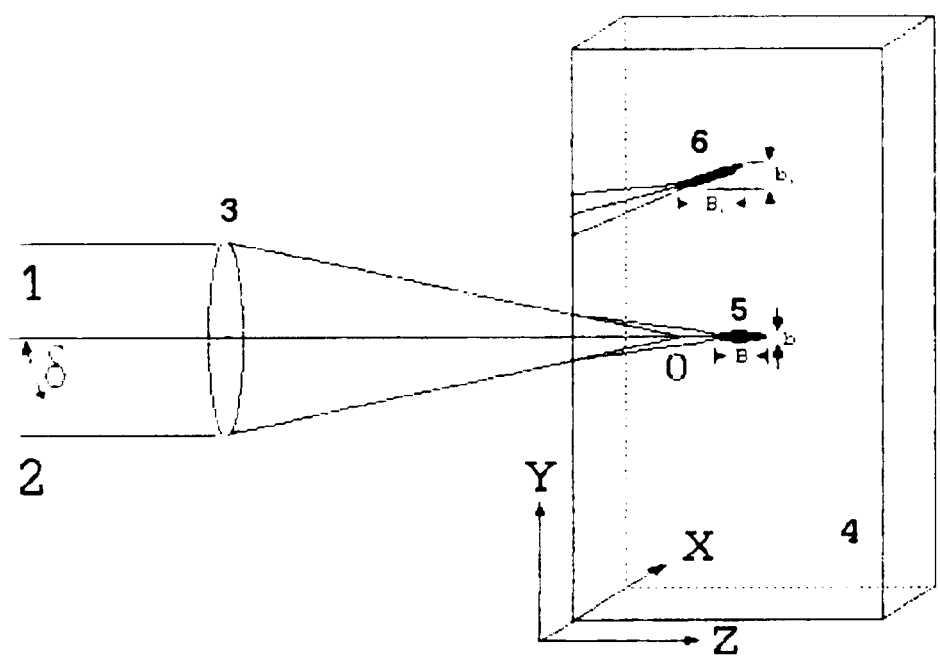
FIG. 1 illustrates modification of visible sizes of laser-induced damages, created by deflected beams: 5 is a damage created by the beam 1; 6 is a damage created by the beam 2; B and $B_1$ are the damage sizes along the laser beams 1 and 2 accordingly; b and $b_1$, are the damage sizes along the axes Y; 3 is a lens focusing beams 1 and 2 inside the article 4.

Reference is now made to FIG. 1, which illustrates this phenomenon. Two beams 1 and 2 pass through the focusing lens 3. The beam 1 is perpendicular to the front face of the sample 4, and $\delta$ is the angle between the said beams. Point 0 is the focused point of the transparent material, if it has the refractive index equaled to 1. For the transparent material with the refractive index more than 1, the focused point, where the breakdown occurs, drifts deeper into the material. As a result of the breakdown, the laser-induced damage 5 is created. Actually, its size (B) along the laser beam is larger than its sizes (b) in the perpendicular plane. The focus of the beam 2 drifts along Z and the breakdown progressing along the beam creates the laser-induced damage 6, which has an angle with respect to the damage 5. Taking into account the large size of the damage along the beam, we see that the projection size ($b_1$) of the damage 6 on the plane perpendicular to the sample surface is substantially larger than the value (b). Since the viewing direction is perpendicular to the sample surface, the spectator sees very strong fluctuations of damage sizes. But damage size determines the damage brightness (shades of gray) and therefore variation of damage orientation gives rise to gray shades fluctuations of the laser-induced damage image. Another effect of very strong damage sizes fluctuations connects with the change of laser energy distribution at the focal spot, when laser beam direction is changed. To decrease the effect it is necessary to use special expensive focusing lenses.

Fluctuations of visible damage sizes decrease the image quality. Consequently, the increase of the production speed by using the deflector results in the decrease of image quality. To limit this effect it is necessary to bound the angle by the value $\alpha$, in which the deflector can be used. The limitation does not give a chance, using the deflectors, to produce enough large laser-induced damage images.

Hence, the use of a deflector gives a chance to speed up the image production, but makes worse the image quality and limits the sizes of images, which can be produced by the systems.

One or more embodiments of the present invention are a system, which is capable to increase the angle value $\alpha$ and consequently, to increase the sizes of the images produced by the system. The system uses two laser beams: the first beam is focused at a selected point of a transparent material; the second beam is perpendicular to the first beam and passes through the same point. The first beam has power density, which is smaller than the threshold level necessary to create the breakdown in the material point. Similarly, the second beam can not create the breakdown, but when the first beam is focused at a point and the second beam traverses this point, power density of the cross area (product space) exceeds the threshold and the breakdown occurs inside the area. Controlling the sizes of the second beam, it is possible to produce a laser-induced damage, which is very short and therefore its projection on the surface sample has small sizes.

Figure 2:
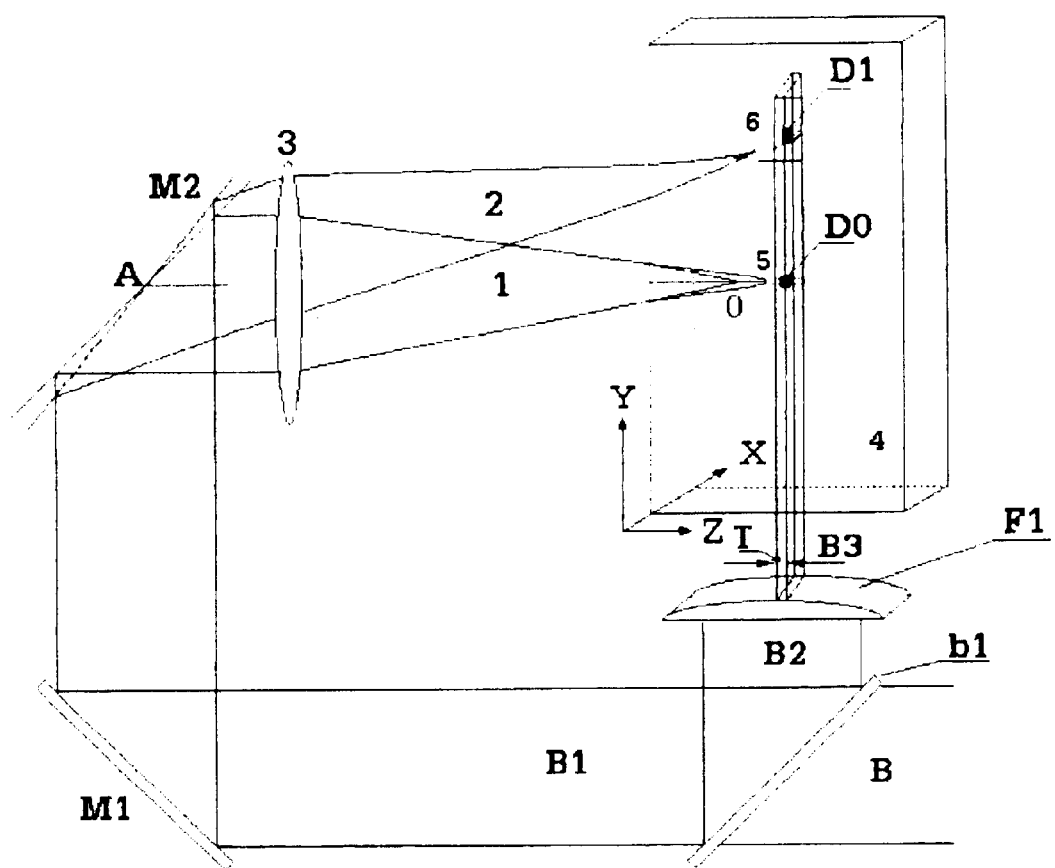
FIG. 2 illustrates a system, which decreases the fluctuations of damage sizes, when laser beam deflector is used: B is the original laser beam; b1 is a beam-splitter; B1 and B2 are laser beams after the beam-splitter b1; M1 and M2 are transfer mirrors; 3- is a focusing lens; F1 is an optical system transferring the beam B2 into a flat beam B3; T is a thickness of beam B3; D0 and D1 are the intersection areas of the flat beam B3 with the focused beams 1 and 2 accordingly.

Reference is now made to FIG. 2, which illustrates the principle of the system operation. The pulsed laser beam B is divided by a beam-splitter b1 into two separate beams B1 and B2. The beam B1 is directed by the transfer mirror M1 and optical deflector M2. In the simplest case, optical deflector is a transfer mirror, which can turn relatively axis A. For example, two different direction of the mirror M2 and accordingly beams 1 and 2 are shown on the FIG. 2. The broken curves 5 and 6 show the areas, where the damages are created, if the beam B1 has enough large power density to create the breakdown. But in the system, the power density of the focused beam B1 does not exceed the threshold. The beam B2 passes through the optical system F1, which forms the beam B3. This beam is flat with thickness of T and it is parallel to the sample surface. The power density of the beam does not exceed the threshold, but total power density inside the intersection of areas (D0 and D1) exceeds the threshold and therefore breakdown occurs only in the areas. Although the laser-induced damages sizes are larger than the sizes of the areas, the shapes of the damages are similar to the areas shapes. In a result of this, the projections of the damages on the plane parallel to the sample surface are similar. Of course, the statement is correct while the artifact connecting with orientation modification is general. When the beam angle exceeds the critical value $\beta$, other artifacts, connected with focus forming of the inclined beam, become general. However, the value $\beta$ is greater than the value $\alpha$.

Take into the consideration the following points:
1) Usually, the image area is essentially larger than the area corresponding to the angle $\beta$ and therefore although, the angle value $\beta$ is greater than the angle value $\alpha$, it is necessary to shift the deflector (or the sample) during the image production.
2) The damage created by intersection of focal spot and the said plane is shifted concerning the right position and therefore it is necessary to consider the deviation, when the right beam direction is determined.

One or more embodiments of the present invention are a system, which is capable to produce high quality laser-induced damage images by generating breakdowns in several points inside the right damage area. Such damages have very specific characteristics and using them, it is possible to create high quality images. U.S. Pat. No. 6,333,486 to Troitski discloses the system, which use an array of small lenses for generating the damages. Disadvantage of the system is the extension of the focal spot, corresponding to each separate lens, and as a result of the fact, the demand of the increase of total laser pulse energy. The invention discloses the system, which using only one deflector and only one lens, is capable to generate damages by several small breakdowns without special array of small lens. For this it is necessary to control the work of the deflector by two ways in series: at the beginning the deflector directs the laser beam to the material point, where the damage should be produced and after the deflector deflects the beam, so the beam being focused creates small breakdown inside the damage area; after the damage has been generated the deflector directs the beam to the next material point and so on.

One or more embodiments of the present invention are a system, which is capable to produce several breakdowns inside the damage area by only one optical-space modulator without deflection of the laser beam inside the damage area. The optical-space modulator is a computing phase hologram that can produce several focal spots inside the damage area. The right phase structure of the computing phase hologram is calculated so that the laser beam passing through the hologram is focused at several spots. The spots are located inside damage area and the distances between adjacent spots are larger than distance threshold $d_0$ ($d_0$ is a minimal distance which avoids an internal split between the separate etch points). The right phase structure is fabricated using direct e-beam writing in the transparent electron-resist layer followed by ion or plasma-chemical etching. The technique is precise enough to allow the fabrication of high-efficiency computer-generated holograms for the visible and near IR spectral ranges (A. N. Palagushkin et al. "Fabrication of multilevel CGHs using direct e-beam writing", Proceeding of SPIE, Vol. 3348, pp. 76–82, 1997). The optical-space modulator forms each focal spot using all its area and in a result of this the focal spots have smaller sizes than in the case of using the array of small lens disclosed in U.S. Pat. No. 6,333,486 to Troitski. It gives a chance to form the laser-induced damage of more right shape and to control damage brightness with higher precision.

Figure 3:
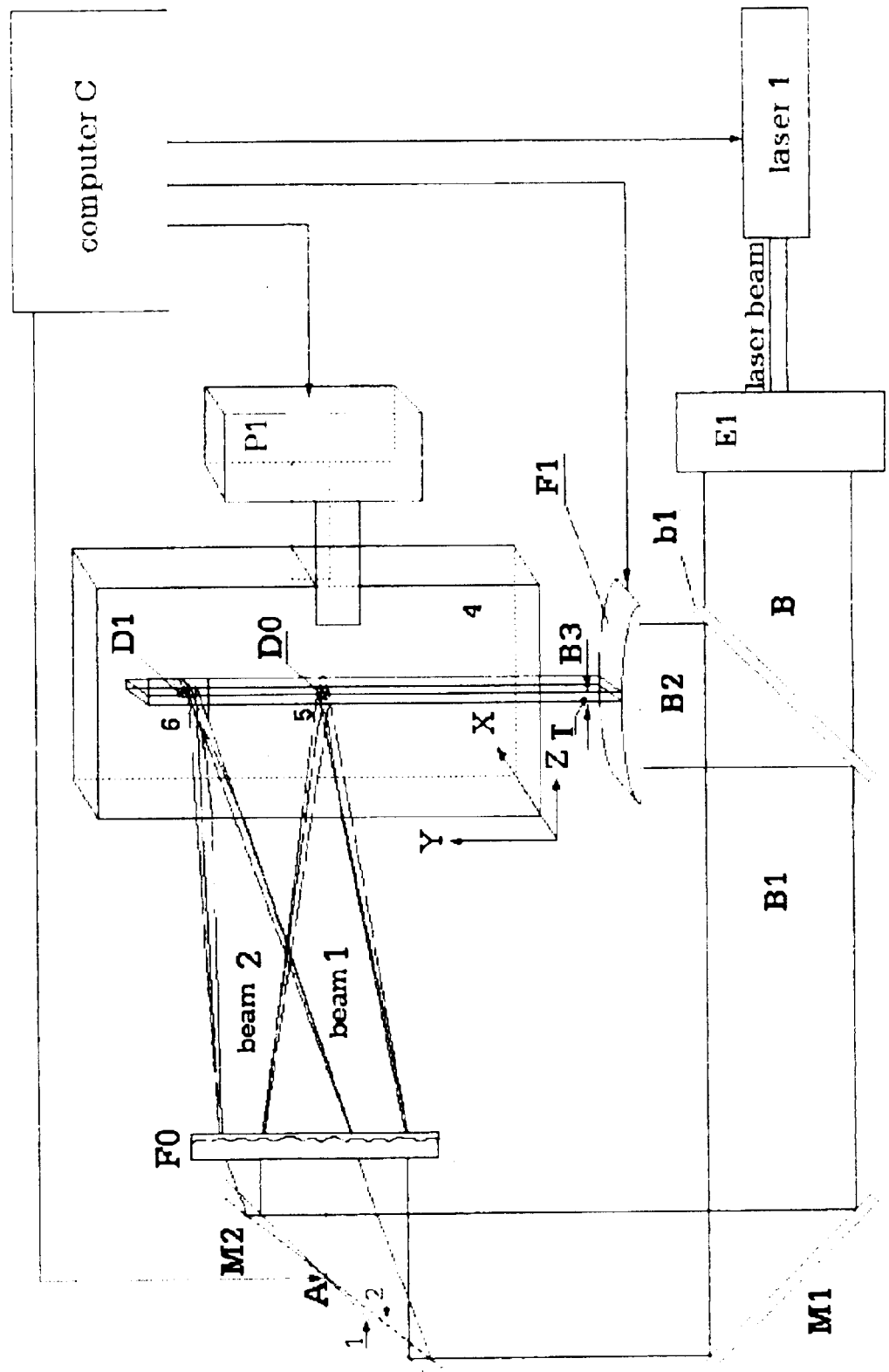
FIG. 3 shows in block-diagram form a laser etching system for high-speed production of high quality laser-induced damage images: laser 1 generates pulse laser beam; E1 is a beam expander; b1 is a beam-splitter; B1 and B2 are laser beams after the beam-splitter b1; M1 is the transfer mirror; M2 is the mirror, which can turn relatively center A; 1 and 2 are two positions of the mirrors corresponding to beams 1 and 2; F0 is the focusing optical system, which focuses the laser radiation at several points inside a damage area; F1 is an optical system transferring the beam B2 into a flat beam B3; T is a thickness of beam B3; D0 and D1 are the intersection areas of the flat beam B3 with the focused beams 1 and 2 accordingly; P1 is the positioner shifting the article 4; computer C controls the pulse energy of laser1, position of the article 4, the thickness of flat beam B3, position of the deflector M2.

Reference is now made to FIG. 3, which illustrates in block-diagram form a laser etching system for high-speed production of high quality laser-induced damage images. The laser 1 is the pulsed laser, the beam of which is capable to create the breakdown inside the transparent material. Its pulse repetition frequency corresponds to the process specification. Once emitted from the laser 1, the pulsed beam through a beam expander E1 is incident upon a beam-splitter b1, which divides the laser beam into two separate beams. One of them B1 is directed by the transfer mirror M1 to the electro-optical deflector M2 (for example, the mirror, which can turn relatively center A and which is controlled by a computer C). This device deflects the beam under the right angle and directs it to the focusing optical system F0, which focuses the laser radiation at several points inside a damage area (for example, a computing phase hologram, the phase structure of which is calculated so that the laser beam passing through the hologram is focused at several spots). The beam-splitter b1 directs the beam B2 to an optical system, which transfers the beam into flat beam B3 by using cylindrical lenses. The thickness T of the said flat beam can be controlled. The flat beam B3 is directed to the article athwart to the optical axes of the focusing optical system F1. Beams B1 and B3 have such energy density values that the breakdowns generated only inside intersection areas of these beams. Positioner P shifts the article 4 and computer C controls the positioner, the optical system F1, the deflector M2 and laser 1.

Now we will describe the production of laser-induced damage images by the system. First of all we should determine the space angle β, within the bounds of which it is possible to produce laser-induced damages by deflection of laser beam without deterioration. The value of the angle together with focal length of the focusing optical system determine the area Ω of damages, which can be created by a deflector. All damages, which should be produced for reproduction of the image, are combined in several groups so that every group corresponds to the said area Ω of damages, which can be produced by the deflection of laser beam. In such a way, the image, which should be produced, is a combination of N areas $\Omega_1 \ldots \Omega_N$. The positioner P shifts the article 4 so that the optical axes of the focusing optical system F1 passes through the center of the area $\Omega_1$. All damages of the area $\Omega_1$ are produced by deflection of the beam and after that the positioner shifts the article 4 so that the optical axes of the focusing optical system F1 passes through the center of the area $\Omega_2$ and so on. The brightness of the laser-induced damage is controlled by the pulse energy and the thickness of the flat beam B3.

One or more embodiments of the present invention are the aptitude of the system to create damages, which can have different brightness for two mutually perpendicular directions. It is also very important that the brightness values can be controlled during image production. The damage brightness from direction of focusing system is determined by the damage sizes at plane XY and therefore it is controlled by the pulse energy value. The damage brightness from the perpendicular direction is determined by the damage size along focused beam and therefore it is controlled by the thickness T of the flat beam B3. In such a way, the system can create a laser-induced damage, the brightness of which changes its value depend upon the direction of observation.

I claim:

1. The system for high-speed production of high quality laser-induced damage images comprising:

a pulsed laser for generating a high energy density laser beam to which the material is transparent;

a beam-splitter, a beam expander, transfer mirrors, a beam deflector;

means for creation of several separate breakdown centers inside each laser-induced damage wherein these centers are generated by using the computing phase hologram; the right phase structure of the computing phase hologram is calculated so that the laser beam passing through the hologram is focused at several spots; these spots are located inside damage area and the distances between adjacent spots are larger than distance threshold $d_0$ ($d_0$ is minimal distance which permits to avoid an internal split between the separate small damages inside the damage area);

means for creation of two laser beams directed inside the article from two mutually perpendicular directions;

means for creating the flat laser beam, allowing to control its thickness;

means for controlling longitudinal size of the laser-induced damage;

means for movement of a damage area inside the transparent material by successive displacement of the article (or the optical system) and by the deflection of laser beam inside the right space angle;

computer system, controlling the operation of the said devices.

2. Method for high-speed production of high quality laser-induced damage images inside transparent material comprising:

division of the said image on several image areas so that damages corresponding to the pixels of the each said image area can be produced by the deflection (the scan) of laser beam without displacement of the said transparent material and the laser relative to one another;

broadening of the angle, in which laser-induced damages can be produced with prescribed sizes by scanning laser beam without displacement of the said transparent material and the laser relative to one another;

focusing laser radiation at the predetermined points so that laser-induced damages have given sizes and orientation;

creation of the said laser-induced damages corresponding to different said image areas by the displacement of the said transparent material and the laser relative to one another.

3. System for high-speed production of high quality laser-induced damage image within transparent material comprising:

means for the determination of the image areas, pixels of which correspond to the laser-induced damages, which can be produced by scanning laser beam without displacement of the said transparent material and the laser relative to one another;

means for the scan of the laser beam so that it can be focused at the predetermined points of the said transparent material without displacement of the said transparent material and the laser relative to one another;

means for the increase of the bound of the angle, in which laser-induced damages can be produced with prescribed sizes by scanning laser beam without displacement of the said transparent material and the laser relative to one another;

means for the displacement of the said transparent material and the laser relatively one another.

4. The system in accordance with claim 3 wherein special mirrors and focused lenses direct and focus scanned laser beam at the predetermined points of the transparent material so that the said beam is perpendicular to the article surface.

5. The system in accordance with claim 3 wherein each laser-induced damage is created as a result of intersection of two mutually perpendicular beams; the beams are generated by a beam-splitter, which divides the original beam into two beams; one of these beams is directed by the transfer mirrors to the optical system which focuses it at the right point of the article; another beam is directed into the optical system which transform it into the flat beam; the said flat beam intersects the said focal spot of the first beam; the energy levels of these beams are controlled so that the breakdown is generated only at the intersection area.

* * * * *